P. ALLEN.
AUTOMATIC FIRE EXTINGUISHER.
APPLICATION FILED AUG. 17, 1911.

1,011,005.

Patented Dec. 5, 1911.

WITNESSES.
Albert G. Piegenthowski
George H. McLaughlin

INVENTOR.
Philip Allen
By Horatio E. Bellows
ATTORNEY.

UNITED STATES PATENT OFFICE.

PHILIP ALLEN, OF PROVIDENCE, RHODE ISLAND.

AUTOMATIC FIRE-EXTINGUISHER.

1,011,005.

Specification of Letters Patent. Patented Dec. 5, 1911.

Application filed August 17, 1911. Serial No. 644,533.

*To all whom it may concern:*

Be it known that I, PHILIP ALLEN, a citizen of the United States, residing at Providence, in the county of Providence and State of Rhode Island, have invented certain new and useful Improvements in Automatic Fire-Extinguishers, of which the following is a specification.

My invention relates to that class of fire extinguishers which are automatically operated by the pressure of water upon a valve held by a soldered member until a predetermined degree of heat fuses the solder.

The essential objects of my invention are to employ a minimum number of parts; to avoid the necessity of a metallic plate or cap upon the valve as a bearing for the strut, since such plates have by their tendency to slide from position rendered the assemblage of the parts difficult and the structure insecure; to obviate the necessity of chalking the valve; to render the valve self leveling; to facilitate the dispersion of the strut pieces after rupture of the joint; to improve the bearing of the strut upon the valve, whereby the valve is prevented from rolling when the device is not operating, and is induced to roll when the levers are released; to slightly increase the tension upon the operative parts to increase the aggregate deflections which may occur; and to cheapen and simplify the construction of the entire device.

To the above ends primarily my invention consists in such parts and in such combinations of parts as fall within the scope of the appended claims.

Figure 1:
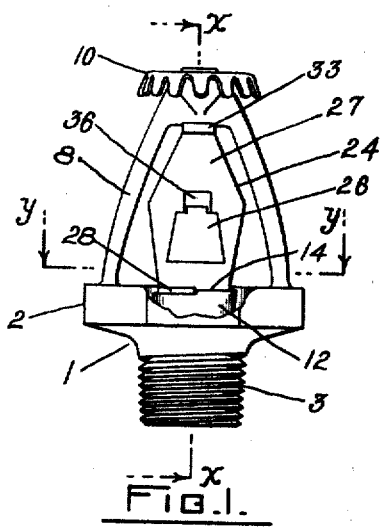
Figure 2:
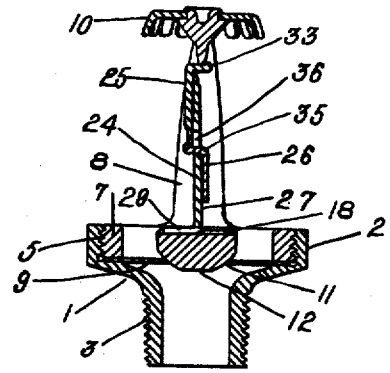
Figure 3:
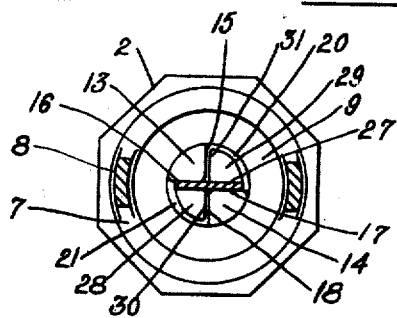
Figure 6:
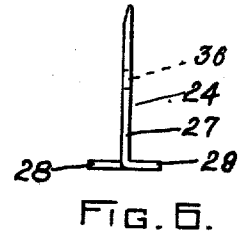
Figure 4:
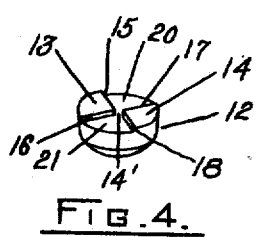
Figure 5:
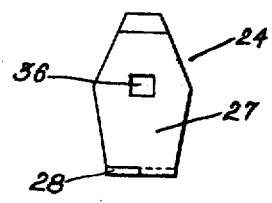
Figure 8:
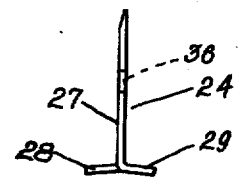
Figure 7:
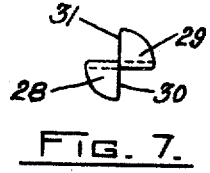

In the accompanying drawings which form a part of this specification, Figure 1 is a side elevation of an extinguisher embodying my invention, Figs. 2 and 3, sections of the same respectively on lines x x and y y of Fig. 1, Fig. 4, a perspective view of the valve, Figs. 5, 6, and 7, front, side, and bottom plan views respectively of the lower member of the strut, and Fig. 8, a side elevation of the strut member before assembling.

Like reference characters indicate like parts throughout the views.

My device comprises a base 1 consisting of a polygonal body portion 2 and threaded shank portion 3 to adapt the same as a pipe fitting and facilitate the use of a wrench. The polygonal portion of the base consists of a vertical flange provided with internal threads 5 adapted to engage an exteriorly threaded ring 7 which forms the base of the arch 8 and bears upon the upper marginal face of valve seat 9 which may constitute a diaphragm. The arch 8 carries the usual deflecting plate 10, and the disk or plate 9 is provided with a central opening 11 to receive the convex lower face of the valve 12. This valve may be composed of glass, porcelain, or any other hard or vitreous substance. In detail the valve is provided upon its top face with two oppositely disposed segmental shaped elevations 13 and 14 whose points are interspaced from each other at the center of the valve surface as at 14'. The sides of the elevations constitute shoulders. The elevation 13 has sides or shoulders 15 and 16, while the similar elevation 14 has shoulders or sides 17 and 18. Shoulders 15 and 18 are in substantial alinement, and shoulders 16 and 17 parallel with each other. The described elevations form resultant depressions or seats 20 and 21 of segmental outline.

The valve holding device consists of a strut 24, a primary lever 25, and a secondary lever 26. The strut 24 comprises a broad body portion 27 provided upon its lower or valve bearing end with two transversely disposed oppositely directed flat lateral lugs 28 and 29 of segmental outline, one straight margin of each lug being formed by the plate itself, and the other straight edges, 30 and 31 respectively, being in substantial alinement. The plate 24 is composed of elastic material and when originally struck upon the dies the lugs or ears 28, 29, are slightly inclined downwardly from the body portion as shown in Fig. 8. After assemblage however the lower faces of the ears are forced into contact throughout their areas with the surfaces or seats 21 and 20 of the valve. The ears then assume a position in the same horizontal plane as shown in Fig. 6. The stored up energy in the ears is sufficient to impart an initial impulse or increase the impulse which scatters the parts when fusion occurs. Therefore it is not essential with the form of strut that the valve seat 9 have elasticity, but if the latter is elastic the ears valuably augment such elastic action. It will be observed that the ears 28 and 29 afford a maximum of bearing area upon the valve and distribute the pressure thereon. A secure relative positioning of the valve and strut is secured by the abutment of the straight edges and margins of the ears against the radial shoulders 15, 16, 17, and 18 of the segmental elevations. The primary lever 25 has its offset portion 33 soldered against the arch and is in contact with the upper end of the strut as usual. The secondary lever has its offset portion 35 extending through an orifice 36 in the strut to engage the lower end of the lever 25 as usual. The parts 26 and 27 are engaged to each other and to the strut by solder in the usual well known manner.

What I claim is:—

1. In an automatic fire extinguisher, the combination with valve seat and arch, of a valve in the seat, a strut, flat ears extending from opposite sides of the strut, resting against the valve, elevations upon the valve against which the edges of the ears are adapted to abut, and operative connections between the strut and the arch.

2. In an automatic fire extinguisher, the combination of a valve seat, a valve in the seat, a strut provided with transversely disposed oppositely directed elastic ears resting upon the valve, heat actuated devices pressing the strut toward the valve whereby the ears are sprung out of their original shape so that when the heat actuated devices release the strut an impulse will be imparted to the strut.

3. In an automatic fire extinguisher, the combination with the valve seat and arch, of a valve in the seat provided with oppositely disposed segmental elevations upon its face forming resultant segmental seats, a strut, ears upon the strut registering in the seats, and lever connections between the strut and the arch.

In testimony whereof I have affixed my signature in presence of two witnesses.

PHILIP ALLEN.

Witnesses:
  HORATIO E. BELLOWS,
  GEORGE H. MCLAUGHLIN.